Figure 1:
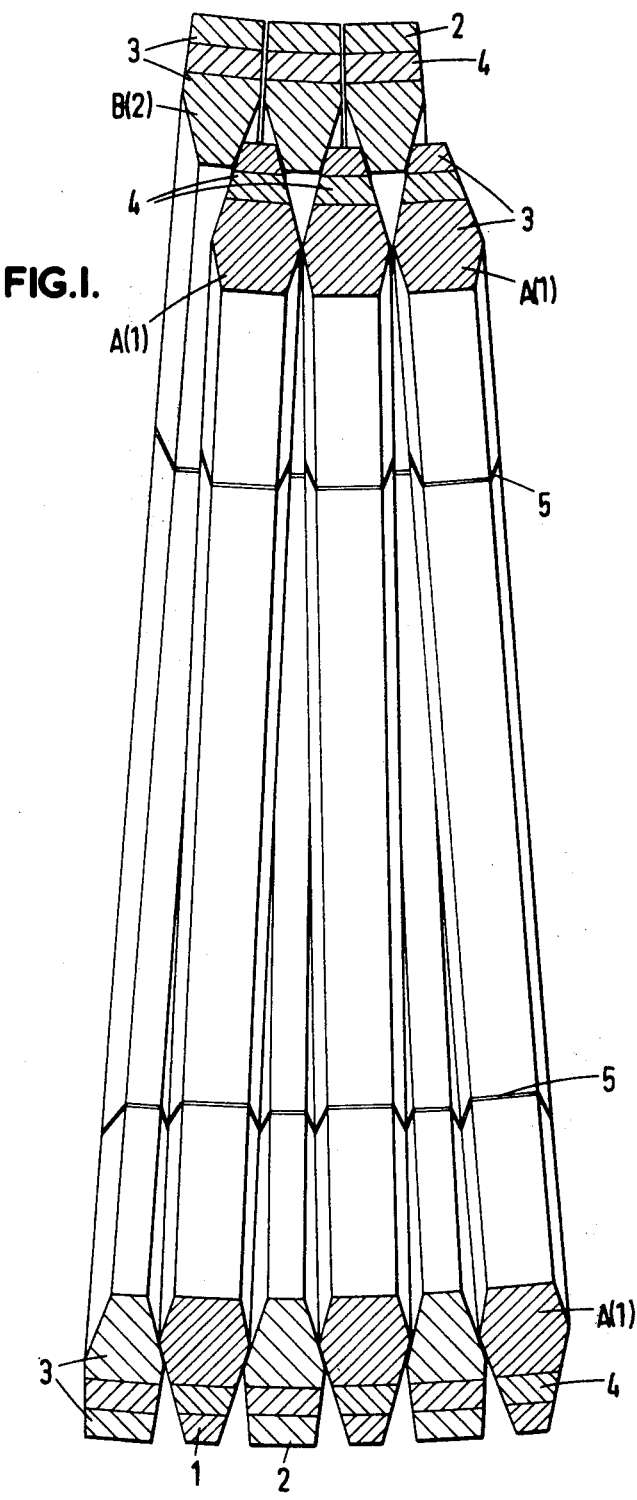

United States Patent [19]
Farfaletti-Casali et al.

[11] 4,116,264
[45] Sep. 26, 1978

[54] NUCLEAR REACTORS

[75] Inventors: Falviano Farfaletti-Casali, Milan; Friedrich G. Peter, Ranco Uponne; Peter G. Gritzmann, Ranco, all of Italy

[73] Assignee: European Atomic Energy Community (Euratom), Luxembourg

[21] Appl. No.: 521,143

[22] Filed: Nov. 5, 1974

[30] Foreign Application Priority Data

Nov. 5, 1973 [GB] United Kingdom ............... 51300/73

[51] Int. Cl.$^2$ .............................................. F21B 1/00
[52] U.S. Cl. .......................................... 165/47; 176/3
[58] Field of Search .................... 176/38, 65, 87, 64, 176/3, 1; 220/3; 165/97; 52/245

[56] References Cited
U.S. PATENT DOCUMENTS

| | | | |
|---|---|---|---|
| 2,991,238 | 7/1961 | Phillips et al. | 176/3 |
| 3,612,331 | 10/1971 | Jorgenson | 220/3 |
| 3,748,226 | 7/1973 | Ribe et al. | 176/3 |
| 3,859,615 | 7/1975 | Luton Jr. et al. | 176/3 X |

FOREIGN PATENT DOCUMENTS

| | | | |
|---|---|---|---|
| 881,401 | 1/1943 | France | 220/3 |
| 1,434,801 | 9/1970 | Fed. Rep. of Germany | 176/87 |

*Primary Examiner*—Charles J. Myhre
*Assistant Examiner*—Theophil W. Streule, Jr.
*Attorney, Agent, or Firm*—Stevens, Davis, Miller & Mosher

[57] ABSTRACT

A hollow toroidal assembly, for example a heat and radiation blanket for a nuclear fusion reactor, has an improved modular structure. The toroidal assembly is formed by a number of annular modules of at least two types, each module being subdivided into submodules. The modules are conically converging at the outer or inner circumferential side so that they are tightly mounted in an alternating configuration. When providing a blanket for a nuclear fusion reactor the toroidal assembly surrounds the toroidal plasma reaction cavity and provides efficient cooling or heat exchange through the modules. The toroidal assembly advantageously provides a convenient subdivision of the blanket surrounding a plasma cavity into a sufficient number of separate modules.

8 Claims, 11 Drawing Figures

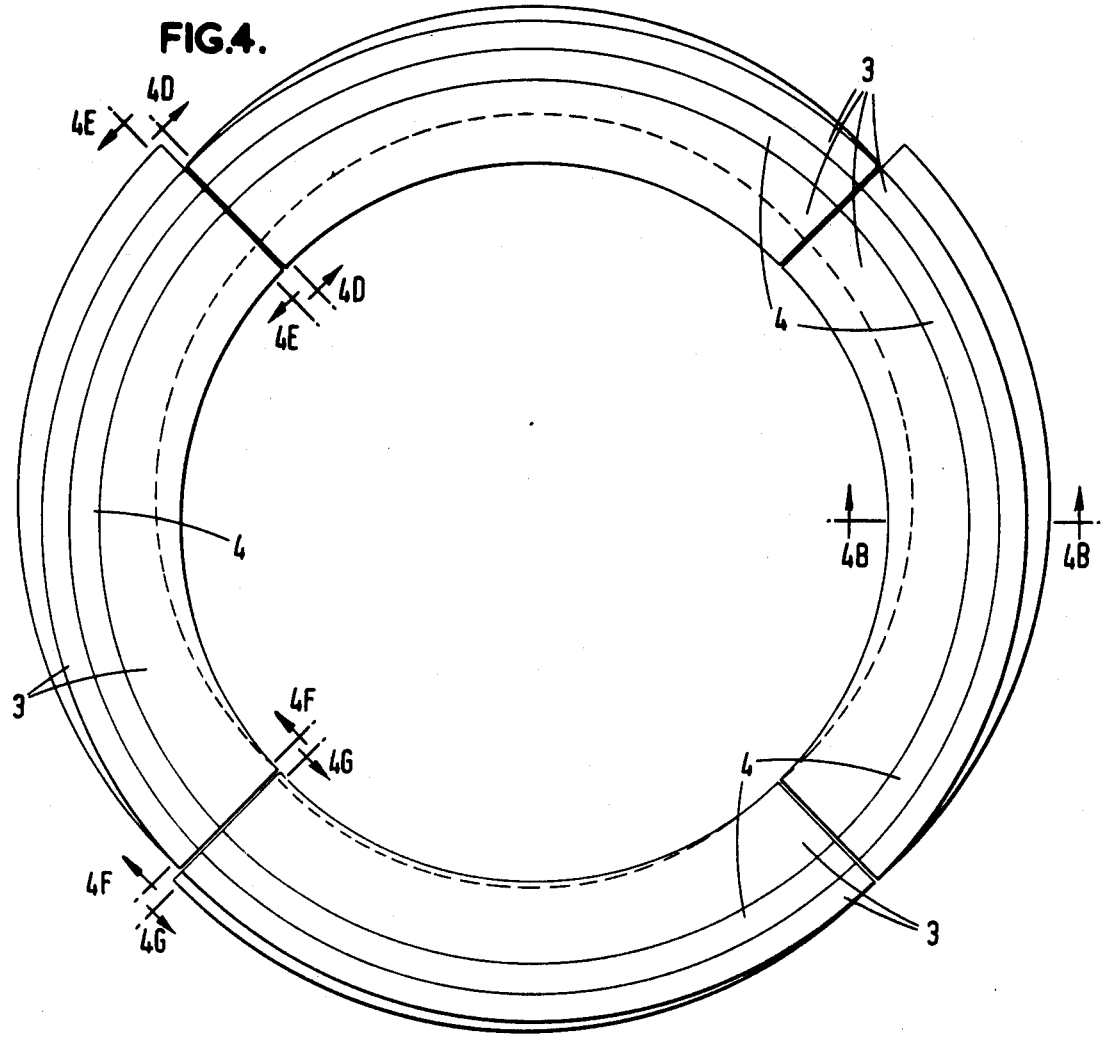
FIG.4.
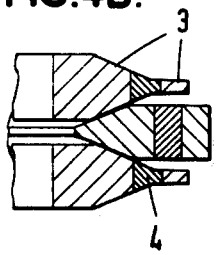
FIG.4B.
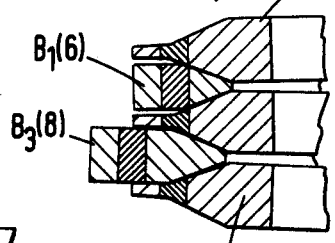
FIG.4D,E.
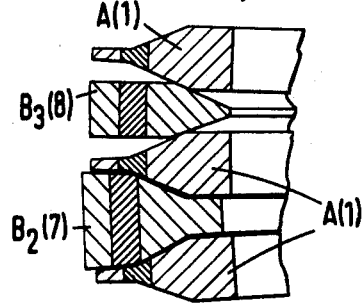
FIG.4F,G.

NUCLEAR REACTORS

This invention relates to nuclear reactors and to the modular structure of a hollow toroidal assembly for example a toroidal blanket for a thermonuclear reactor.

One of the technological problems connected with the construction of nuclear fusion reactors of the toroidal type is to construct a convenient subdivision of the toroidal blanket surrounding the plasma cavity with separate modules in a sufficiently great number. The construction should satisfy the particular mechanical and operational requirements in the case of a large fusion reactor. According to existing proposals, the blanket may be constituted as a hollow toroidal structure, in which liquid lithium surrounds the plasma reaction chamber principally and this is provided with a cooling system for the extraction of heat generated in the blanket. It appears not to be advisable and, at the least, very difficult to have a monolithic or single structure blanket, when the diameter of it ranges, for example, between 20 - 25 m. Furthermore, the breakdown or damage of such a blanket would put the whole nuclear reactor out of use.

One approach for the modular subdivision of the the toroidal blanket would be to divide it into a limited number of equal radial sectors, which are herein called slices. In this solution, the modules in themselves would still have considerable dimensions for example, a diameter ranging between 6 - 7 m. Additionally the subdivision into modules cannot be extended to extreme numbers of modules.

From the mechanical point of view, the blanket assembly could possibly be composed of a number of say 10 (angular width 36°) to 40 (angular width 9°) modules, the angular width being measured from the axis of the plasma chamber. From the point of view of heat extraction however, each module would have to be further subdivided into a set of cells or submodules. Although the submodules obtained would be of a uniform shape, they would still be too large in diameter, as mentioned above, and their conicity would constitute a disadvantage for easy fabrication. Therefore, a further subdivision of the submodules would become necessary in the circumferential sense. This means, that each submodule of annular form would then be composed of a sequence of small annular sections.

The total effect of all these modules would constitute an extremely complicated blanket structure comprising a large number of pieces of different geometrical shape. For the example given above, the toroidal ring can be thought to be subdivided into at least 120 slices (each of them having an angular width of 3° as seen from the center of the torus), and each slice should comprise at least 36 circumferential sections (every section having an angular width of 10°, seen from the axis of the plasma cavity). Therefore the toroidal blanket would be composed of 4320 pieces. One major disadvantage of this multi-piece-structure would be that, each piece of module would suffer from a double conicity — radial and circumferential — so that it should have transversal cross-sections different in every point and along all directions.

The cooling problem would also be increased. The present invention is concerned with a new type of subdivision of a toroidal blanket, in which the above mentioned difficulties and problems are obviated or at least considerably reduced. Broadly speaking in this blanket, submodules (or generally speaking modules) around the plasma chamber are forseen without conicity at all, but with a normal axial symmetry. Further, the modules are radially disposed to form a circular assembly, each module being eventually subdivided in the circumferential direction into submodules.

According to the present invention there is provided a hollow toroidal assembly comprising at least two types of annular modules tightly mounted in an alternating manner, each module being subdivided in the circumferential direction into submodules and having a uniform cross-section, said two types of modules being different in cross-section and diameter correspondingly, the type of modules of the smaller diameter being conically converging at least at the outer circumferential side of the module whereas the modules of the larger diameter are conically converging at least at the inner circumferential side of the module, and that the conically tapered rims of the modules in the assembly abut against each other along a circular path, the central axis of which is displaced radially to the center of the toroid with respect of the toroidal chamber axis.

The invention also includes the modules which are adapted to form the toroidal blanket and further includes a nuclear reactor comprising the toroidal assembly or modules surrounding the plasma reaction cavity.

Preferably the surfaces of the abutting portions of the modules of smaller diameter are slightly concave, whereas the corresponding portions of the larger modules are slightly convex.

The toroidal assembly is preferably suitable for use as a heat and radiation blanket for surrounding the plasma cavity of a toroidal nuclear fusion reactor.

Conveniently each module is provided with cooling means which may comprise a plurality of cooling pipes disposed along the length of the module for transporting a cooling fluid, e.g. helium through the module.

In terms of the principal concept underlying this new configuration it can be said that, the system resembles a composite system of concave and convex lenses as in the optical field arranged in toroidal form.

Figure 2:
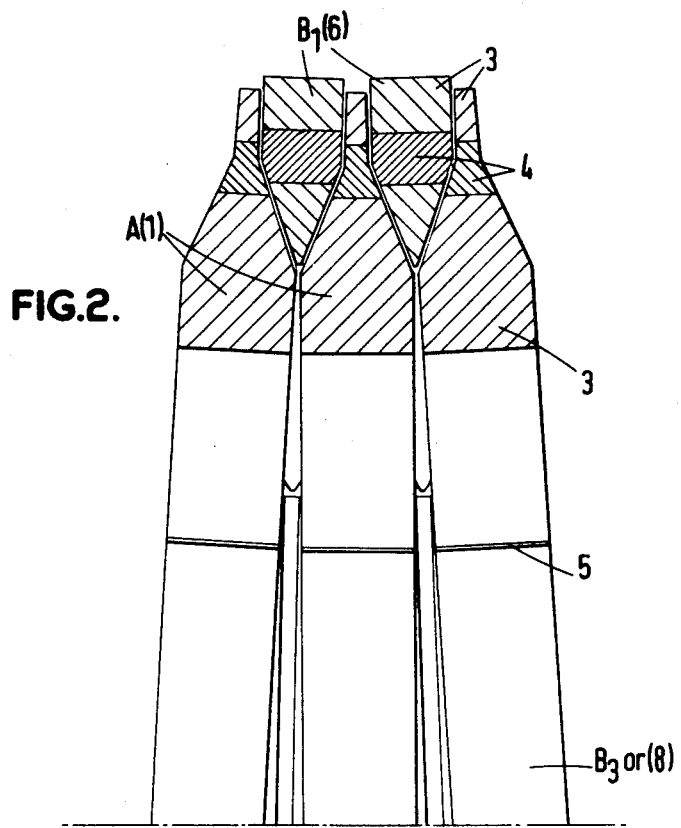
Figure 2:
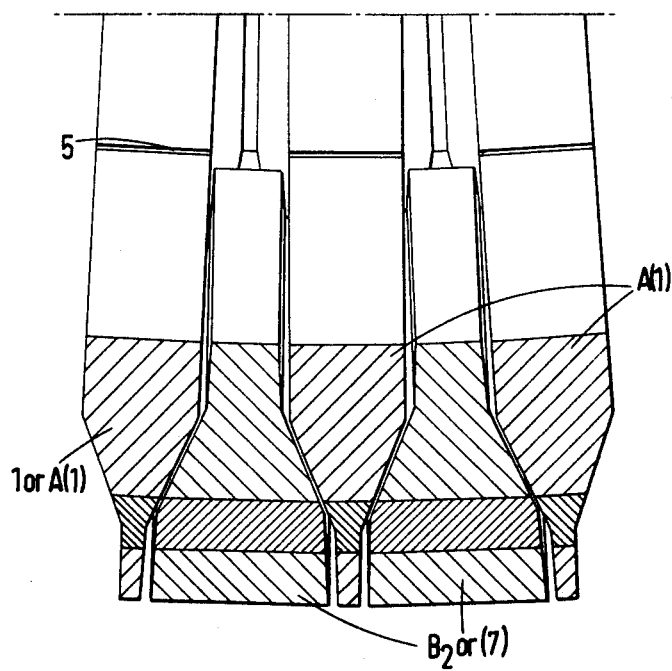
Figure 3:
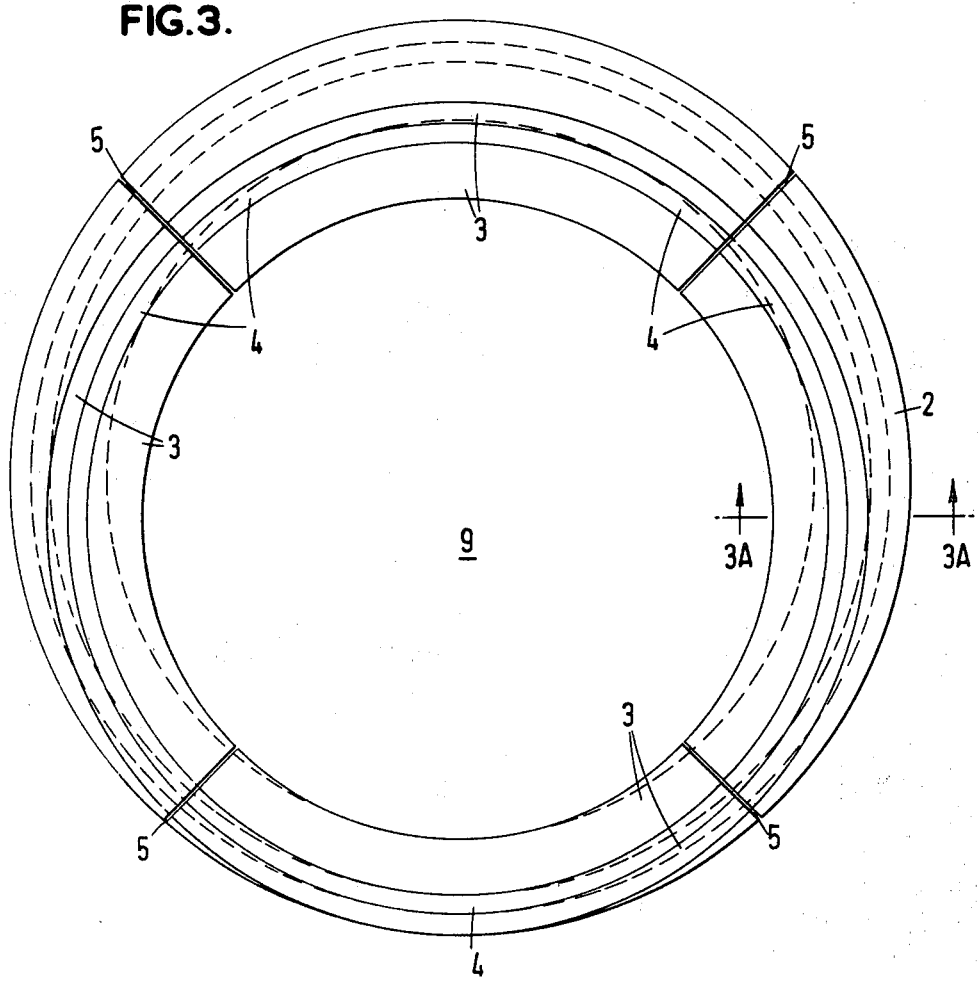
Figure 3A:
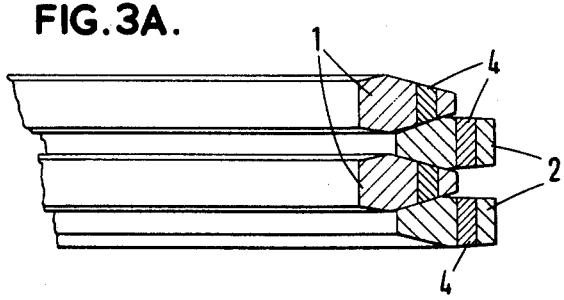

The invention will now be described, by way of example only, with reference to the accompanying drawings in which:

FIG. 1 is a horizontal radial cross-section through a number of modules forming the toroidal blanket (the two different types of module being labelled A(1) and B(2), FIG. 2 is a horizontal, radial cross-section through a number of modules forming the toroidal blanket (the types of module being A(1), B1(6), B2(7) and B3(8), in which only modules A and module sections, B1 and B2 appear cut), FIG. 3 is a vertical cross-section through the toroidal blanket around the plasma chamber, wherein the blanket is composed of the modules as shown in FIG. 1, FIG. 3A is a cross-section of the blanket of FIG. 3 along the line 3A—3A.

Figure 5:
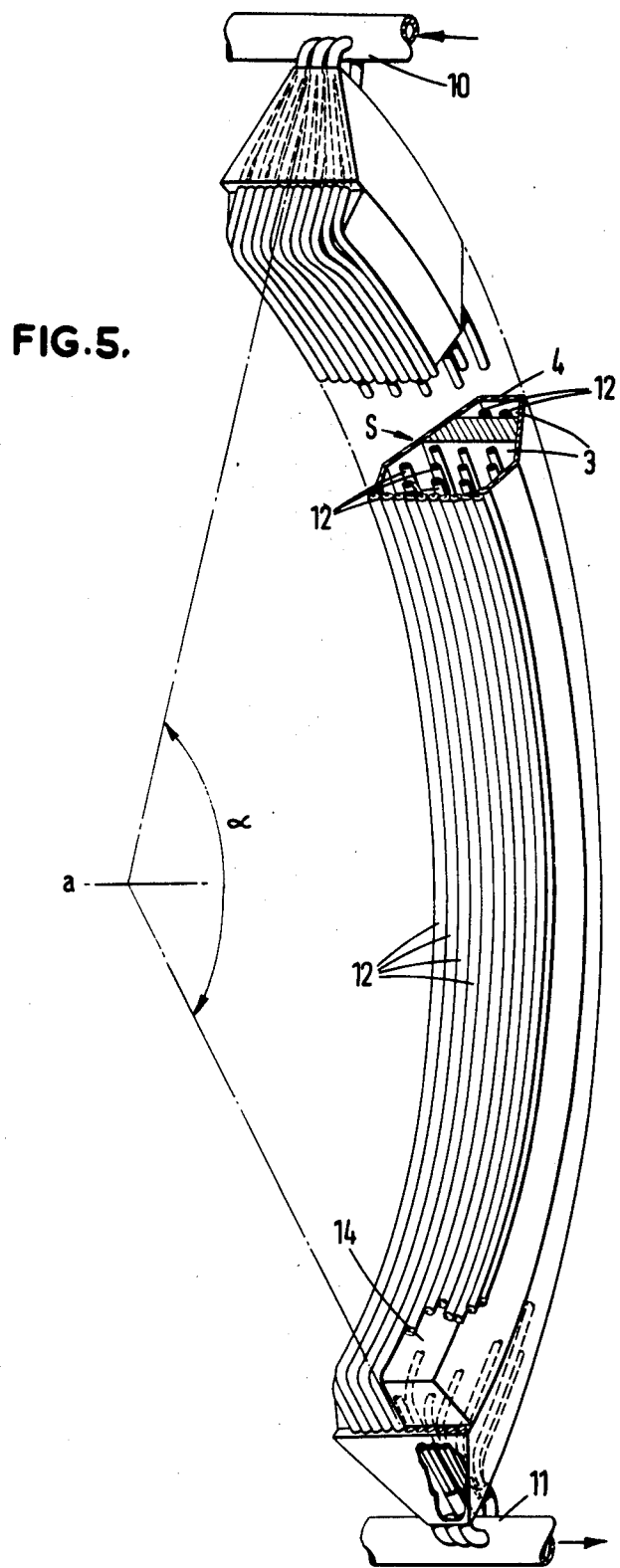

FIG. 4 is a vertical cross-section through the toroidal blanket around the plasma chamber, wherein the blanket is composed of the modules as shown in FIG. 2, FIGS. 4B, 4F, G and 4D, E are a sequence of radial cross-sections along the lines 4B — 4B; 4F — 4F and 4G — 4G; 4D — 4D and 4E — 4E; respectively through the toroidal blanket illustrated in FIG. 4 around the plasma chamber, wherein the blanket is composed of the modules as shown in FIG. 2 (in which module A and all module sections B1, B2 and B3 appear cut), and FIG. 5 is a perspective view of a simplified module of type A or B provided with a heat extraction device or cooling system.

It should be noted that, in the blanket structures shown in FIGS. 2, 4 and 4B, 4F, G and 4D, E respectively, the module B is subdivided into sections B1, B2 and B3, of which B1 and B2 are of different cross-section and located respectively at the inner and external circumference of the torus, whereas the section B3 is present twice and is at the lower and at the upper side of the torus (in the circumferential spaces between B1 and B2).

The pipes 12 of the cooling circuit, in the case where a fluid is used which is different (for example helium) from that used for filling the blanket (for example lithium) can be placed inside the module as shown in FIG. 5. Furthermore with this embodiment, it is possible to make the surface constituting the wall 14 of the module directly exposed to the plasma column, where the cooling should be more efficient, composed of a bundle of cooling pipes, such as 12, parallel, adjacent and soldered to each other along a generatrix.

The module is divisible by means of concentric cylindrical surfaces, in several concentric layers containing lithium 3 and graphite 4, easily cooled by bundles of parallel tubes 12. The cooling circuit, e.g. helium, may be made as illustrated; the helium enters at one extremity of the module through inlet collector pipes 10, travels along the length of the module 1 or 2 and exits at the other extremity by outlet collector pipes 11.

An important part of the present invention is the assembly of modules having an axially-symmetrical geometry, and of a blanket having a toroidal form and a circular section; and to determine the form of said modules to make a continuous blanket surrounding the toroidal plasma cavity, by using the smallest number of different modules. As will be explained further, two solutions have been found, respectively with 2 and 4 different types of modules or rings which are satisfactory for the geometry of the blanket and for its maintenance and operation.

In FIG. 1 there is shown the realization of the blanket with two different kinds of modules or rings, A and B, alternately disposed, adjacent and with their lateral surfaces in contact. Dimensionally, the radius of the axis of the cavity is 10 m. and the diameter of said cavity is 5 m.

This embodiment of modular subdivision contains 100 rings of type A and 100 rings of type B for the entire blanket. Each ring A and B is then divided into four quadrant sectors or modules of 90° (see FIG. 3) but other divisions into sectors are possible. In this embodiment the blanket will be made up of 400 modules of type A and 400 modules of type B making a total of 800 modules which is very satisfactory for a good modular division from most points of view.

To permit free thermal expansion and to facilitate the disassembly of the blanket a small interstice 5 is maintained between adjacent modules in the same ring. The same vacuum existing in the plasma cavity 9 is present in the interstices 5.

Thermal insulation between adjacent modules is also advantageously ensured and the geometrical form of the modules is simplified because the lateral spherical surfaces, not in contact, may be approximated to conical surfaces, owing to the large radius of the ring. Obviously each module may be independently supported, in its position, by an external support structure fastening in a known manner.

A type B module, as seen in FIG. 1, may be easily disassembled, from the blanket, and a type A module may be disassembled by removing the two adjacent modules B and this is facilitated by the fact that the rings are divided into sectors.

In FIG. 2 there is shown another embodiment which utilizes 4 different types of modules, instead of two.

The total number of modules employed is always 800 but in this case, while the type A modules are of the same kind, the type B modules are now of three different kinds, and this permits a greater uniformity and a more correct geometry of the blanket.

As in the previous embodiment the blanket is divided into 4 sections one constituting the inner sector, one the outer sector and the other two the intermediate sectors, symmetrically disposed. These sectors are made up of modules of types B1, B2 and B3 respectively. The cross-section of these modules is a little different from that of those of the previous embodiment, and this fact allows the most favorable geometry to be obtained for the blanket. While the modules of type B1 and B2 number 100, the modules B3 number 200.

As can be seen from FIGS. 2 and 4, the type B1 modules are opposed to type B2 modules; and the two type B3 modules are opposed, in the same ring.

In FIG. 5 there is shown an example of a suitable module covering a given angle around the plasma cavity. In this case the module is described by the rotation of an angle alfa, ($\alpha$) of its transverse section B around an axis $a$ tangential to the axis of the plasma column. The sides of the section B, describing the sector, become part of cylindrical or conical surfaces and the module results in having in every point of its development a transverse section equal to the section originating the module.

We claim:

1. A hollow toroidal assembly for a reactor comprising at least two types of annular modules, said modules being tightly mounted in an alternating manner, each module being subdivided in a circumferential direction into submodules and having a uniform cross-section, said two types of modules having different cross-sections and diameters respectively, said type of module having a smaller diameter including first conically converging rims at least at the outer circumferential side of said module, and said type of module having a larger diameter including second conically converging rims at least at the inner circumferential side of said module, wherein said first and second conically converging rims of said modules in the assembly abut each other along a circular path, said circular path being displaced radially to the center of the toroidal assembly with respect to the toroidal assembly axis.

2. A toroidal assembly according to claim 1 wherein the surfaces of the abutting rims of the module of a smaller diameter are slightly concave, whereas the corresponding abutting rims of the larger module are slightly convex.

3. A toroidal assembly according to claim 1 wherein each module comprises a plurality cooling pipes disposed along the length of said module for transporting cooling fluid through said module.

4. A toroidal assembly according to claim 1 wherein at least one of said types of modules is subdivided into four quadrant submodules.

5. A hollow toroidal assembly for a reactor comprising four types of annular modules, said modules being tightly mounted in a predetermined manner, each module extending in a circumferential direction and having a uniform cross-section, said four types of modules having different cross-sections and diameters, respectively, said four types of modules including conically converging rims at inner and outer circumferential sides whereby said rims of two adjacent modules of said four modules abut each other along a circular path, said circular path being displaced radially to the center of the toroidal assembly with respect to the toroidal assembly axis.

6. A hollow toroidal assembly according to claim 5 wherein the assembly includes four sectors and two of said modules are located in two respective sectors of the assembly and respectively at inner and outer circumferences of the assembly, and another of said modules is located in two other sectors in the circumferential spaces between the sectors in which said two modules are located.

7. A hollow toroidal assembly according to claim 6 wherein said another module in one of the sectors is at a lower side of the assembly and in another of the sectors at the upper side of the assembly.

8. A hollow toroidal assembly according to claim 7 wherein the fourth of said modules is located in all of said four sectors.

* * * * *